June 7, 1938.  H. R. DARLING  2,119,845
CAMERA SHUTTER
Filed Dec. 29, 1936
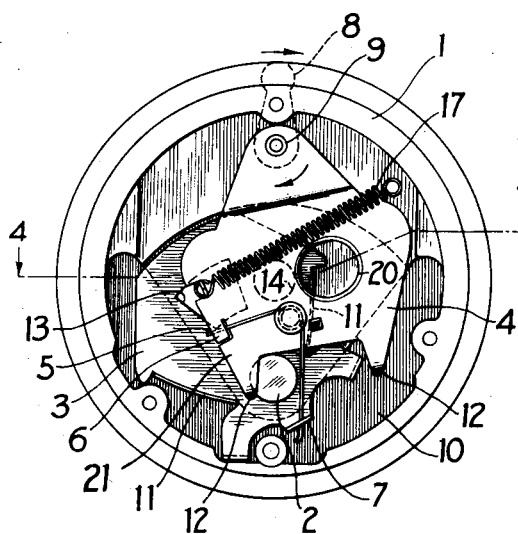
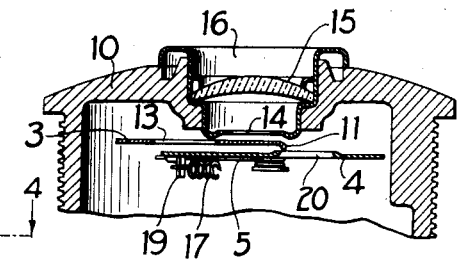
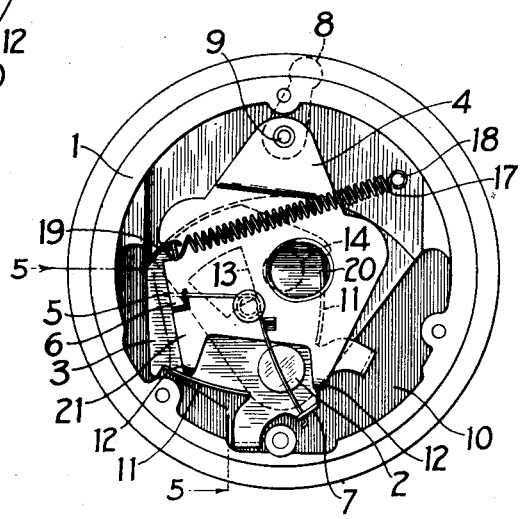
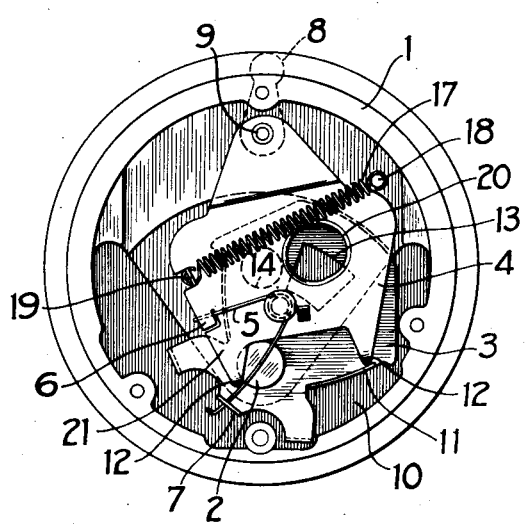
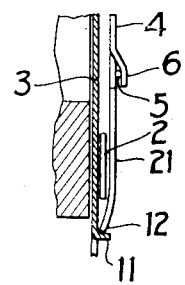
HARRY R. DARLING
INVENTOR.
BY
ATTORNEYS Patented June 7, 1938

2,119,845

UNITED STATES PATENT OFFICE 2,119,845

CAMERA SHUTTER

Harry R. Darling, Rochester, N. Y., assignor to Eastman Kodak Company, Rochester, N. Y., a corporation of New Jersey Application December 29, 1936, Serial No. 118,066

3 Claims. (Cl. 95—60)

This invention relates to photography, and more particularly to shutters for inexpensive photographic cameras.

One object of my invention is to provide a shutter in which comparatively light pressure on the trigger is all that is necessary for making an exposure. Another object of my invention is to provide a shutter in which the shutter operating spring is a very light-weight spring and is one which will make the shutter blade move without causing it to shake or jar. Another object of my invention is to provide a shutter cover plate on an extension of the trigger and to use a spring for holding this plate in one direction which is much heavier than the shutter operating spring, in order to cause the shutter parts to move smoothly. Still another object of my invention is to provide a flange and arm connection between the cover plate and shutter plate which permits energy to be stored in the operating spring by moving the cover plate while the shutter plate remains stationary. Another object of my invention is to provide connections between the cover plate and shutter plate permitting the former to be moved the greater part of its maximum movement before allowing movement of the shutter plate, and other objects will appear from the following specification, the novel features being particularly pointed out in the claims at the end thereof.

Coming now to the drawing wherein like reference characters denote like parts throughout:

Fig. 1 is a rear elevation of a camera shutter constructed in accordance with and embodying a preferred form of my invention.

Fig. 2 is a view similar to Fig. 1, but with the parts moved to a different position.

Fig. 3 is a view similar to the preceding views, but with the parts in still another position.

Fig. 4 is a cross-section on line 4—4 of Fig. 1, and

Fig. 5 is a fragmentary detail, partially in section, showing the interconnecting shutter and cover blade, flange and arm.

This shutter is an improvement over the shutter shown in U. S. Patent 1,997,331, Fuerst, granted April 9, 1935.

Like the shutter shown in the above patent, this shutter is of the simplest construction in which a shutter casing 1 can be suitably made of molded material this shutter casing supporting, on a pivot 2, a shutter blade 3. The shutter blade 3 is preferably connected to a cover blade 4 by means of a spring 5, one end of which engages a lug 6 on the cover blade, and the other end of which engages a lug 7 on the shutter blade. Energy is stored in this spring by moving the cover blade 4 by means of a camera trigger 8 which is attached to a shaft 9 passing through the front wall 10 of the shutter cover and adapted to make an exposure.

The similarity between the shutter shown in the above-mentioned patent and this application stops here. The present invention resides in part, in providing a flange and arm connection between the shutter blade and the cover blade, so arranged that movement of the cover blade in either direction can take place without movement of the shutter blade, thus storing up energy in the spring 5 to operate the shutter blade at a predetermined speed.

To accomplish this, I may provide on the shutter blade 3 a pair of arcuately disposed flanges 11 which project up a relatively short distance from the shutter blade 3, as best shown in Fig. 5. To engage these flanges, I provide a pair of downwardly-formed arms 12 on the cover blade, these arms being rounded and being adapted to swing behind the flanges.

Referring to Fig. 1, when the trigger 8 is moved in the direction shown by the arrow, an arm 12 rides along the inside of the flange 11 during the first part of the trigger movement. As the trigger is moved from its initial position of rest, shown in Fig. 1, to the position shown in Fig. 2, the arm 12, by engaging the flange 11 holds the shutter blade 3 against movement while energy is stored in the spring 5. When the parts move just beyond the position shown in Fig. 2 and the arm 12 slips off the end of the arcuate flange 11, the spring 5 causes the shutter blade to snap quickly to the position shown in Fig. 3. In making this movement, the slot 13 in the shutter blade 3 swings past the exposure opening 14, which may form the diaphragm for a lens 15 mounted in the shutter front 10 by means of a suitable ferrule 16. As the slot 13 swings past this opening, an exposure of predetermined duration takes place, because a predetermined amount of energy has been stored in the spring 5 by the first part of the movement of the cover blade 4.

A very similar movement takes place when the shutter 8 is released, the parts being actuated by a spring 17 which may be anchored on a post 18 carried by the camera casing 1 at one end and may be anchored on a lug 19 carried by the shutter cover blade 4 at the other end. As the trigger is released, this spring causes the cover plate to move towards the position shown in Fig. 1. In so doing, the arm 12 engages and slides on the arcuate flange 11 as shown in Fig. 3, thus holding the shutter blade against movement until the arm slips off the end of the flange, at which time a predetermined amount of energy has been stored in the spring 5 which returns the shutter blade to its initial position of rest.

With shutters of this type, it is, of course, necessary, to make an exposure, to have all of the apertures in the shutter in alinement. Thus, in making an exposure, the aperture 13 in the shutter blade 3 must lie over the aperture 14 in the shutter casing and at the same time an aperture 20 in the cover blade 4 must likewise lie in alinement with the other two apertures. It is, therefore, desirable to move the cover blade to the proper position before releasing the shutter blade.

In this shutter the trigger is moved in the same direction each time to make an exposure, and consequently, as the parts return to their normal position of rest, the aperture 20 in the cover blade 4 must be moved out of alinement with the exposure aperture 14 to prevent an exposure from being made as the shutter blade returns to its initial position of rest. With the construction above described, this movement is assured because as will be indicated from Fig. 3, the aperture 20 is already out of alinement with the exposure aperture 14 before the shutter blade 3 has started its return movement. Consequently, when the parts get just beyond the position shown in Fig. 3 and the arm 12 slips off the flange 11, the return movement of the shutter blade will not permit light to pass through the aperture 14, thus ruining a film.

It should be noted that the pivotal points of the shutter blade and cover blade are oppositely disposed with respect to the exposure aperture. The pivot 2 is on one side of the aperture and the stud 9, with which the cover blade moves, is directly opposite. While this is not essential, it is a convenient way to design the parts because it permits both the shutter blade and the cover blade to be made symmetrical in shape, the arcuate flanges 11 extending to each side of the pivot 2 in a symmetrical pattern and the flange engaging arms 12 being equally spaced away from the shaft 9.

The path of movement of the arms 12 is such that when the trigger 8 is moved in the direction of the arrow shown in Fig. 1 for making an exposure, an arm rides against a flange until it slips off the end, at which time the shutter blade will move to the position shown in Fig. 3. When pressure on the trigger 8 is released, the arm 12, of course, moves through the same path. However, during this movement, as indicated in Fig. 3, it passes on the opposite side of the flange 12 which was engaged during movement in the reverse direction. As the shutter blade returns to its initial position, the flange passes beneath that part of the shutter blade 21 which lies substantially in a plane, as indicated in Fig. 5, only the arm 12 being formed downwardly to engage the flange 11.

Thus, in a complete cycle of movement, one arm moves up engaging one side of the flange, slipping off the flange at the end and then in its idle return movement passes around the opposite side of the flange idly while the opposite arm is in engagement with the opposite flange. Thus, the movement of the shutter blade is entirely controlled by the arm and flange connection with the shutter blade and sufficient energy is stored up in the light spring 5 for driving the shutter blade at a fixed speed in both directions, and this relative movement incidentally requires that the aperture 20 in the cover blade be properly positioned both for making an exposure and for making a light safe joint while the parts move to an initial position of rest from which an exposure can be made.

What I claim as my invention and desire to be secured by Letters Patent of the United States is:

1. In a photographic shutter, the combination with an apertured shutter casing, of an apertured shutter blade, a pivotal support therefor near one edge of the shutter casing, oppositely disposed flanges carried by edges of the shutter blade symmetrically arranged with respect to the pivot, an apertured cover blind, a pivotal support therefor near an opposite edge of the shutter casing from the shutter blade pivot, a trigger directly attached to the cover blind, a pair of symmetrically arranged arms carried by the cover blind and bent downwardly to engage the oppositely disposed flanges on the shutter blade, a hairpin spring connecting the shutter blade and the cover blind, a heavier spring connecting the shutter casing and cover blind, one of the symmetrically arranged arms on the cover blind being positioned to ride idly against one of the symmetrically arranged flanges of the shutter blade while storing up energy in the hairpin spring and being adapted to ride off the end of said flange, causing the hairpin spring to actuate the shutter through movement of the trigger, the relative locations of the pivotal supports and apertures for the shutter plate and cover blind being such that said shutter aperture is in registration with the cover blind aperture when the slip-off of the shutter blade and cover blind occurs, whereby the shutter blade aperture may swing past these registering apertures to make an exposure.

2. In a photographic shutter, the combination with an apertured shutter casing, of a flange surrounding said casing, two pairs of symmetrically arranged stops carried by said flange, of a pair of pivots each positioned between a pair of stops and each positioned on opposite sides of said shutter casing near said flange, an apertured shutter blade mounted on one pivot and including parts adapted to engage each of one pair of stops, said blade having a width greater than half the distance between the stops, a cover blind pivoted on the other pivot and having a width greater than half the distance between the other pair of stops, a spring connecting the shutter blade and cover blind, a trigger for operating the latter, apertures in the shutter blade and cover blind each spaced from the pivotal mounts therefor a distance to register with the aperture in the shutter, means normally holding the cover blind in a position of rest, whereby movement of the trigger may move the cover blind aperture into registration with the shutter aperture, interengaging arms and flanges on the shutter blade and cover blind for controlling movement of the former by the latter, whereby movement of the cover blind by the trigger through a relatively small angle may move the cover blind between its stops and tension the spring to make an exposure.

3. In a photographic shutter, the combination with an apertured shutter casing, of a flange surrounding said casing, two pivots mounted near the flange of said casing on opposite sides of said aperture, a shutter blade pivotally mounted on one of said pivots and adapted to swing back and forth between two stops mounted symmetrically with respect to said pivot adjacent the edges of said shutter casing, a cover blind pivoted on the opposite pivot and having parts adapted to engage a pair of stops arranged on each side of said pivot adjacent the edges of said cover blind, a spring connecting the shutter blade and cover blind, a second spring, stronger than the first, adapted to hold the cover blind in a position of rest against one of said stops, the width of said cover blind being greater than half the distance between said stops, a trigger for actuating the cover blind, and slidable connections on the cover blind and shutter blade for controlling the movement of the latter by the former, whereby movement of said trigger through a relatively small angle may actuate the shutter blade causing it to move between its stops to make an exposure.

HARRY R. DARLING.